(12) United States Patent
Floam

(10) Patent No.: US 11,549,846 B1
(45) Date of Patent: Jan. 10, 2023

(54) PAR SUNLIGHT EXPOSURE INDICATOR FOR OPTIMAL PLANT PLACEMENT

(71) Applicant: Catherine M. Floam, Marietta, GA (US)

(72) Inventor: Catherine M. Floam, Marietta, GA (US)

(*) Notice: Subject to any disclaimer, the term of this patent is extended or adjusted under 35 U.S.C. 154(b) by 225 days.

(21) Appl. No.: 16/998,096

(22) Filed: Aug. 20, 2020

Related U.S. Application Data

(60) Provisional application No. 62/890,226, filed on Aug. 22, 2019.

(51) Int. Cl.
  *G01J 1/42* (2006.01)
  *G01J 1/50* (2006.01)
  *A01G 7/00* (2006.01)

(52) U.S. Cl.
  CPC . *G01J 1/50* (2013.01); *A01G 7/00* (2013.01)

(58) Field of Classification Search
  CPC . G01N 33/0098; G01N 2021/635; G01J 1/50; G01J 1/14; G01J 1/42; G01J 2001/4266; A01G 9/249; A01G 31/06; Y02P 60/14
  USPC ................. 356/213–227, 432; 250/474.1
  See application file for complete search history.

(56) References Cited

U.S. PATENT DOCUMENTS

| | | |
|---|---|---|
| 2,337,534 A | 12/1943 | Barber |
| 2,949,880 A | 8/1960 | Fromer |
| 3,779,651 A | 12/1973 | Gunlock |
| 4,168,124 A | 9/1979 | Pizzi |
| 5,589,398 A | 12/1996 | Krause et al. |
| 6,132,681 A | 10/2000 | Faran et al. |
| 9,658,101 B1 | 5/2017 | Levine et al. |
| 2003/0008409 A1 | 1/2003 | Spearman et al. |
| 2007/0013897 A1* | 1/2007 | Webbeking ............... G01J 1/02 356/222 |
| 2012/0202281 A1* | 8/2012 | Gonzalez ................ F24S 23/71 435/292.1 |
| 2018/0007838 A1* | 1/2018 | McCord ................. H05B 47/16 |

* cited by examiner

*Primary Examiner* — Hoa Q Pham

(74) *Attorney, Agent, or Firm* — Edell, Shapiro & Finnan, LLC

(57) ABSTRACT

A sunlight exposure indicator device is disclosed that can determine the amount of time (e.g., hours) of PAR sunlight that occurs in a specific area for the optimal growth of a plant, as corresponds to the plant industry common designations of Full Shade, Partial Shade, Partial Sun and Full Sun. These designations can be used to determine plant selection for all types of plants including grasses, shrubs, flowers, vegetables and herbs, and trees. This device utilizes irreversible, slow-reacting, photochromic pigments applied to a substrate. Using multiple instances of this device will allow someone to easily test and accurately determine the amount of PAR sunlight (hours) received during a one-day sunlight cycle in multiple spots simultaneously. The sunlight exposure indicator device is a one-time-use, non-electronic, disposable device.

20 Claims, 16 Drawing Sheets

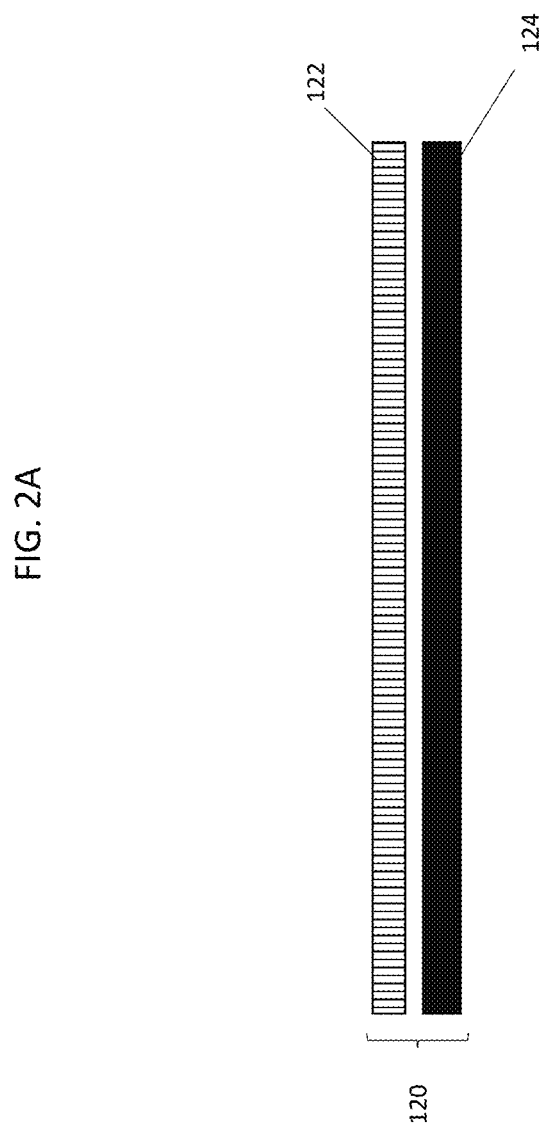

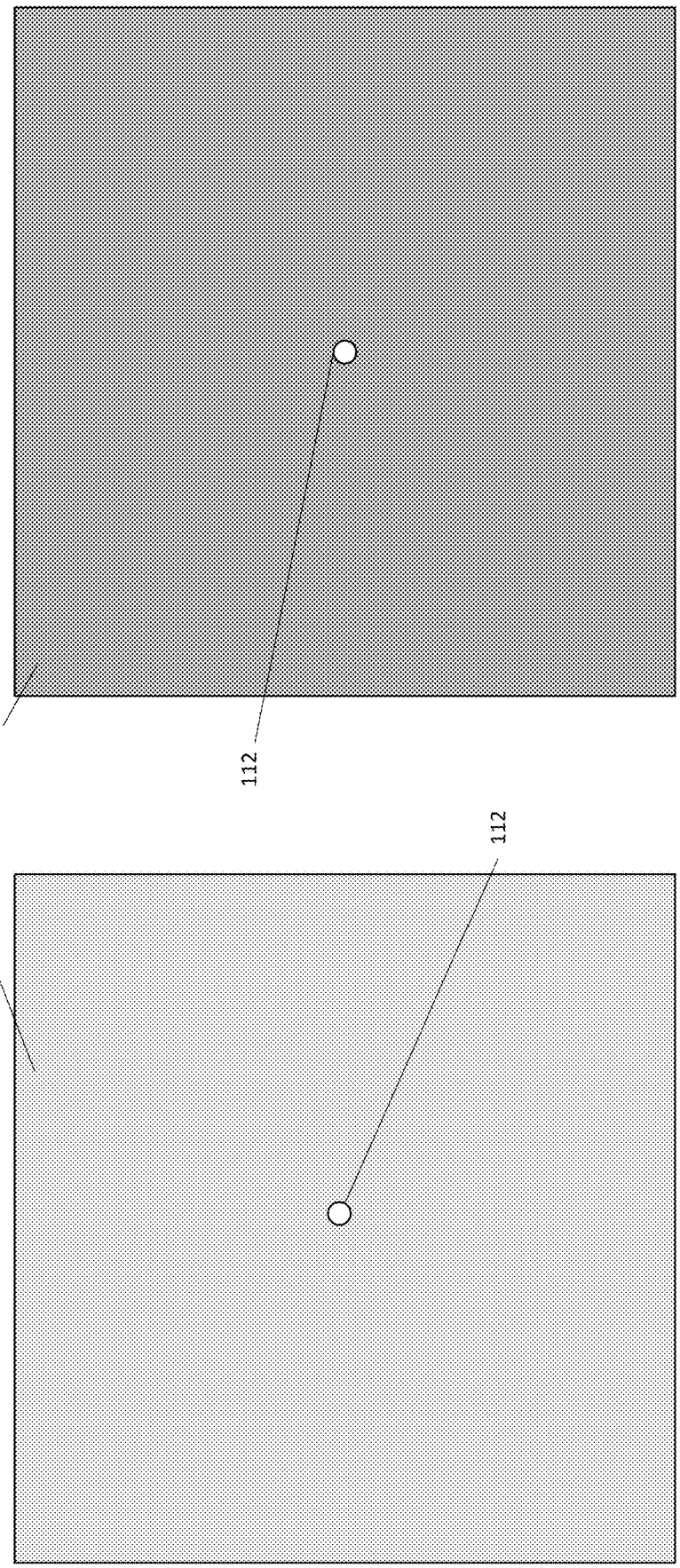

Top View of Sunlight-reactive Paper if 7+ hours of PAR sun exposure using One Irreversible, Slow-reacting, Photochromic Pigment method Top View of Sunlight-reactive Paper if 5 – 6 hours of PAR sun exposure using One Irreversible, Slow-reacting, Photochromic Pigment method

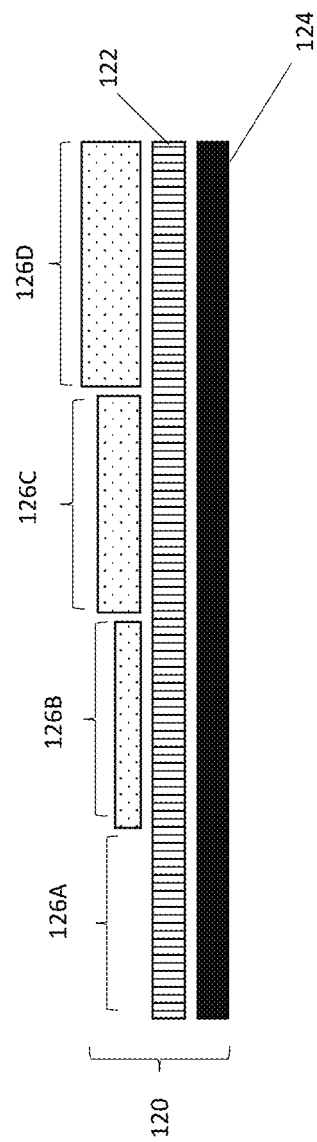

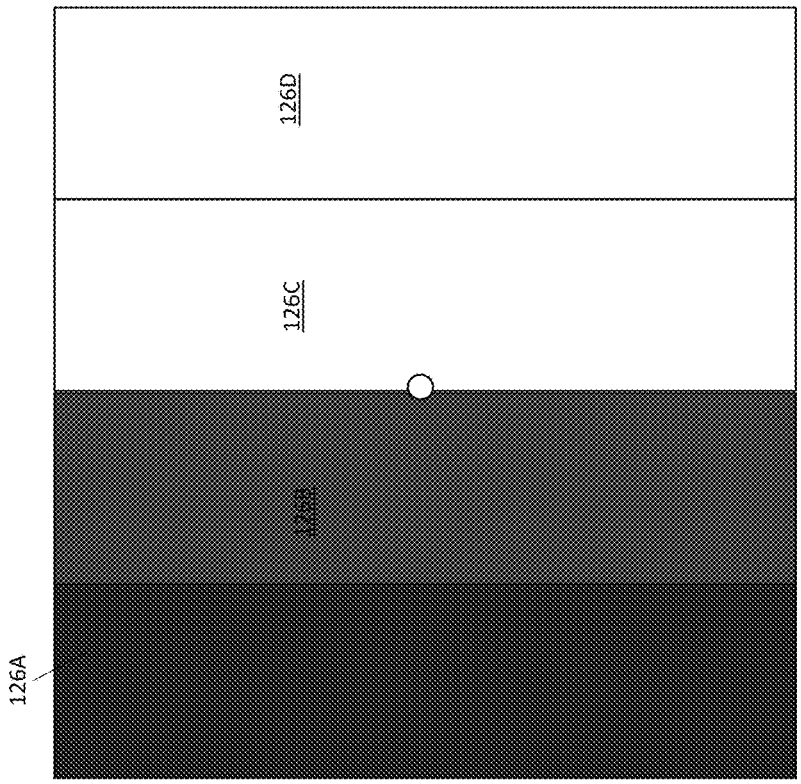
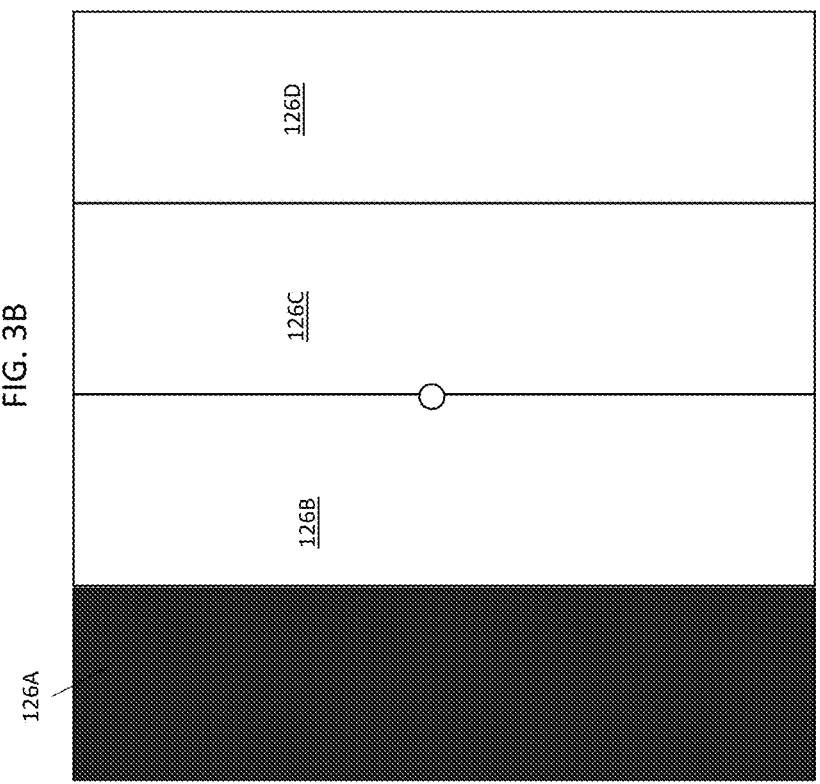

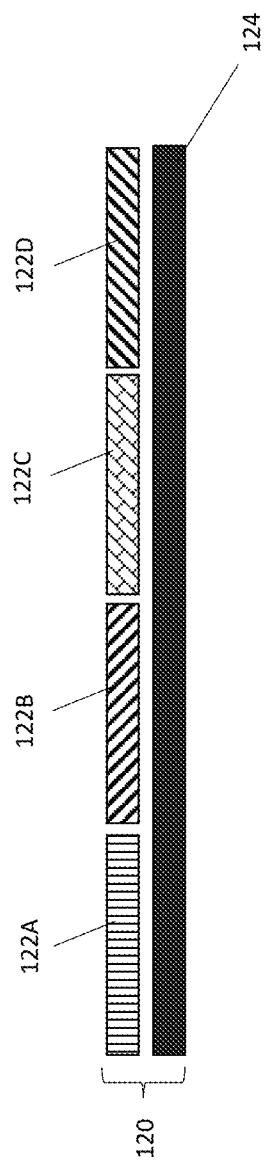

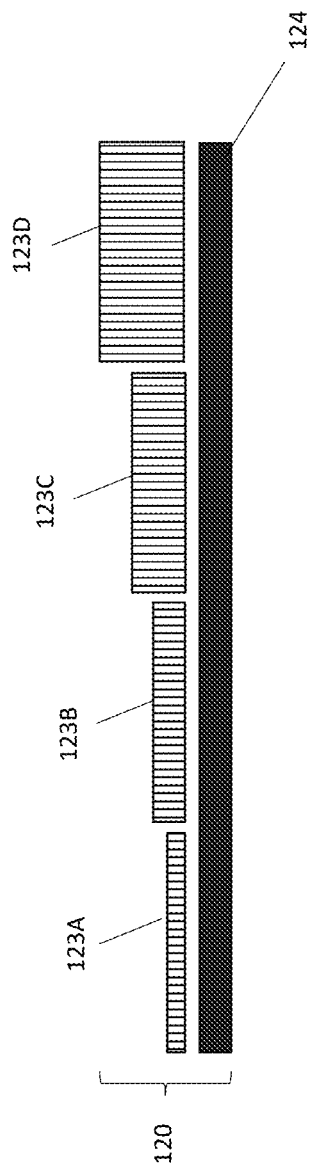

Top View of Sunlight-reactive Paper if 3 to 4 hours of PAR sunlight exposure using the Four Different Irreversible, Slow-reacting, Photochromic Pigments method Top View of Sunlight-reactive Paper if .10 to 2 hours of PAR sunlight exposure using the Four Different Irreversible, Slow-reacting, Photochromic Pigments method Top View of Sunlight-reactive paper if 7+ hours of PAR sunlight exposure using the Four Different Irreversible, Slow-reacting, Photochromic Pigments method Top View of Sunlight-reactive Paper if 5 to 6 hours of PAR sunlight exposure using the Four Different Irreversible, Slow-reacting, Photochromic Pigments method

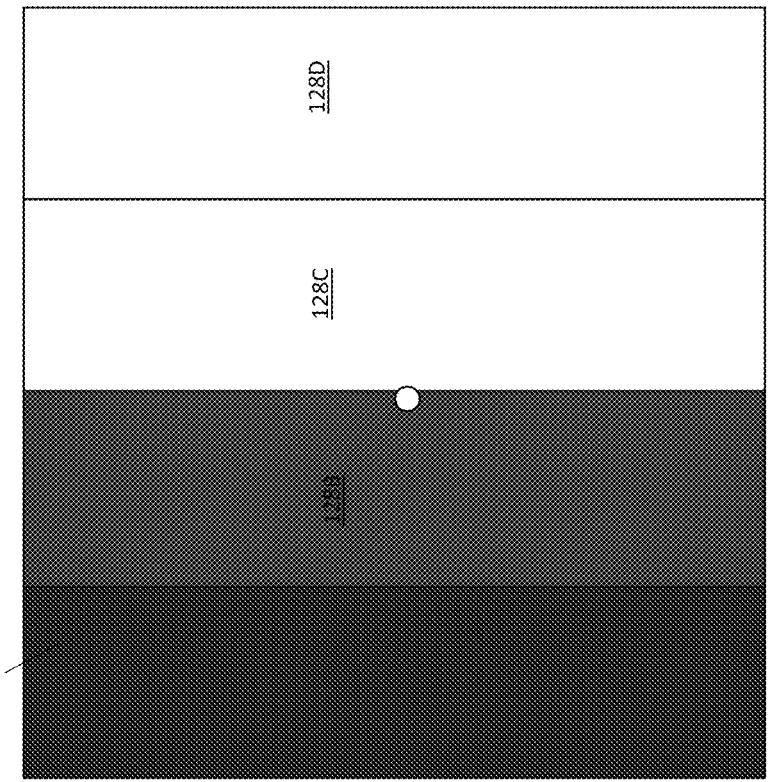

FIG. 5C

Top view of Sunlight-reactive Paper if 3 – 4 hours of PAR sun exposure using the Combination of Two Different Irreversible, Slow-reacting, Photochromic Pigments with Screening method

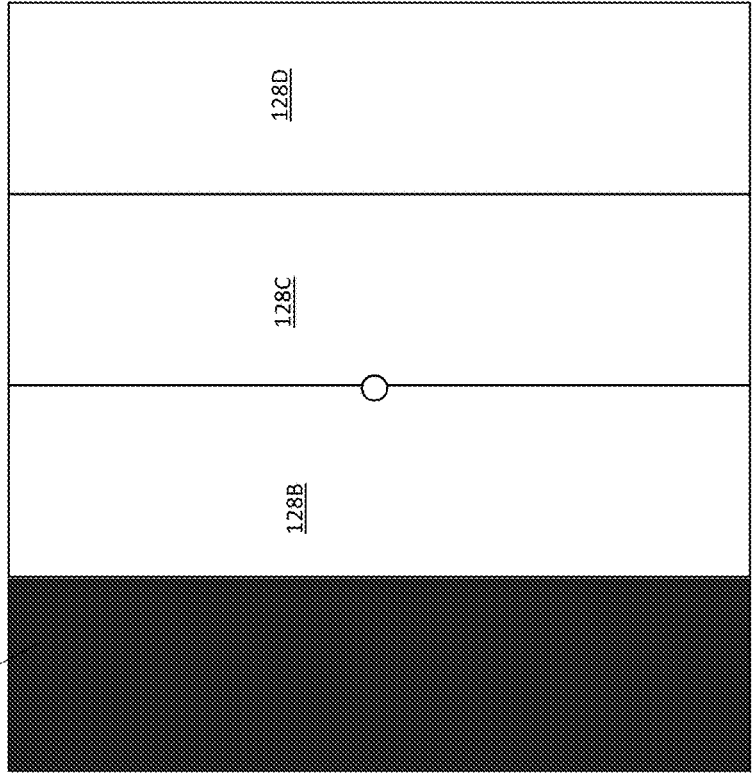

FIG. 5B

Top view of Sunlight-reactive Paper if .10 to 2 hours of PAR sun exposure using the Combination of Two Different Irreversible, Slow-reacting, Photochromic Pigments with Screening method Top View of Sunlight-reactive Paper if 7+ hours of PAR sun exposure using the Combination of Two Different Irreversible, Slow-reacting, Photochromic Pigments with Screening method Top View of Sunlight-reactive Paper if 5 – 6 hours of PAR sun exposure using the Combination of Two Different Irreversible, Slow-reacting, Photochromic Pigments with Screening method

PAR SUNLIGHT EXPOSURE INDICATOR FOR OPTIMAL PLANT PLACEMENT

CROSS REFERENCE TO RELATED APPLICATION

This application claims priority to U.S. Provisional Application No. 62/890,226, filed Aug. 22, 2019, the entirety of which is incorporated herein by reference.

TECHNICAL FIELD

The present disclosure relates to detection of visible sunlight exposure, specifically photosynthetically active radiation (PAR), detection and irreversible photochromic pigments.

BACKGROUND

Different species and varieties of plants have many different requirements for optimal growth. One important requirement is the number of hours and intensity of photosynthetically active radiation (PAR) sunlight exposure the plant receives during a one-day period. Plants use the full spectrum of visible light, the spectrum range from 400-700 nm, in order for photosynthesis to occur and for the plant to grow, flower, reproduce and survive. This spectrum range is known as Photosynthetically Active Radiation (PAR). Plants exposed to insufficient or excessive PAR sunlight can fail to thrive, to develop strong roots, to leaf-out or to grow larger; become susceptible to disease; produce less flowers or fruit; or even die. Thus, it is important to know the amount of PAR sunlight a particular landscape area experiences before selecting and installing plants in those areas. However, it can be difficult to determine how many hours and the intensity of PAR sunlight a particular spot in a landscape area experiences during a one-day time period, due to various factors such as the direction of the sun in relation to the area, whether there are obstructing buildings, trees or other shrubs that block sunlight at certain times of the day, whether the area gets full sun in the morning hours or the more intense later afternoon hours, and the time of year. Attempting to estimate the number of hours of PAR sunlight exposure a certain area may experience by observing the outside area multiple times per day is time-consuming and not very reliable. Residential gardeners as well as professional landscapers and commercial nurseries, who often guarantee their plants, lose time and money on lost plants if their own or their customer's estimation of sunlight is incorrect and they install plants in an area not suitable to the plant's requirements.

SUMMARY OF THE INVENTION

Briefly, a PAR sunlight exposure indicator device is disclosed herein that can determine the amount of time (e.g., hours) and possibly intensity of PAR sunlight that occurs in a specific area for the optimal growth of a plant, as corresponds to the plant industry's common designations of Full Shade, Partial Shade, Partial Sun and Full Sun categorized by a range of hours of sunlight needed per plant. The device could be designed to address a variation of the plant industry's common designations, using three categories instead of four: Full Shade, Partial Shade/Partial Sun, and Full Sun. These designations can be used to determine plant selection for all types of plants including grasses, shrubs, flowers, vegetables and herbs, and trees.

In one embodiment, this device may utilize an irreversible, slow-reacting, photochromic pigment applied to a substrate that reacts by displaying different colors over a twelve and more (12+) hour period based on accumulated hours and possibly intensity of PAR sunlight exposure.

Many photoreactive products on the market are designed to react to UV light primarily in the 260-390 nm range. A device that measures the UV spectrum would not give accurate results for the goal of optimal plant growth. By contrast, the device presented herein does not react to or measure UV sunlight. Rather, it only reacts to and measures the visible spectrum of wavelengths known as PAR (400-700 nm) since this spectrum of wavelengths is required for photosynthesis and optimal growth of plants. This device is unique from photochromic products that measure UV, for example, sun protective products for human skin, UV ray damage measurement products, sterilization indicators, or merely fast color change products.

The irreversibility reactive aspect of the device presented herein is important to its function. The color changes that occur on the device do not revert back to its original color or fade at all during times of shade or after the sun goes down. The irreversibility also makes this device simple to use. A user can put this device in the landscape in the early morning, leave it there all day, and retrieve it after the sun goes down and have permanent and accurate results.

The slow-reaction capabilities of the photochromic pigment(s) in this device is also important for accurately measuring reaction times over the course of 12+ hours, as opposed to the seconds or minutes of reaction time of most (e.g., UV) photoreactive devices.

Because this device is simple and inexpensive to make, multiple devices may be packaged and sold together, allowing a user to easily test multiple areas in a landscape simultaneously to accurately determine the amount of PAR sunlight (hours) received in each spot during one-day. The sunlight exposure indicator device will be a one-time-use, non-electronic, disposable device.

Thus, in one form, a PAR sunlight exposure indicator device is provided that comprises a stake member having a first section and a second section that is transverse to the first section; a sunlight-reactive planar member having a hole therein configured to accept the first section of the stake, wherein the sunlight-reactive planar member comprises a substrate coated or impregnated with a layer of at least one type of an irreversible photochromic pigment that is reactive to exposure to photosynthetically active radiation (PAR) and changes to different colors or shades of a color over different ranges of cumulative hours of exposure to PAR; and a sticker configured to fit on top of the sunlight-reactive planar member over the hole and over the second section of the stake to secure the sunlight-reactive planar member to the stake.

BRIEF DESCRIPTION OF THE DRAWINGS

FIG. 2A is a cross-sectional view of a sunlight-reactive planar member that employs a single irreversible, slow-reacting, photochromic pigment for detecting and displaying PAR sunlight exposure, according to a first example embodiment.

FIG. 2B is a top view of the sunlight-reactive planar member of FIG. 2A subjected to 0.10 to 2 hours of PAR sunlight exposure (Full Shade).

FIG. 2C is a top view of the sunlight-reactive planar member of FIG. 2A subjected to 3 to 4 hours of PAR sunlight exposure (Partial Shade).

FIG. 3A is a cross-sectional view of a sunlight-reactive planar member that employs a single irreversible, slow-reacting, photochromic pigment and a PAR-screening solution, for detecting and displaying PAR sunlight exposure, according to a second example embodiment.

FIG. 3B is a top view of the sunlight-reactive planar member of FIG. 3A that is subjected to 10 to 2 hours of PAR sunlight exposure (Full Shade).

FIG. 3C is a top view of the sunlight-reactive planar member of FIG. 3A that is subjected to 3 to 4 hours of PAR sunlight exposure (Partial Shade).

FIG. 4A-1 is a cross-sectional view of a sunlight-reactive planar member having several different types of irreversible, slow-reacting, photochromic pigments for detecting and displaying PAR sunlight exposure, according to a third embodiment.

FIG. 4A-2 is a cross-sectional view of sunlight-reactive planar member having several different thickness layers of an irreversible, slow-reacting, photochromic pigment for detecting and displaying PAR sunlight exposure, according to the third embodiment.

FIGS. 5A-1 and 5A-2 are cross-sectional views of a sunlight-reactive planar member featuring a combination of two different types of irreversible, slow-reacting, photochromic pigments with a PAR-screening solution, for detecting and displaying hours of PAR sunlight exposure, according to a fourth example embodiment.

FIG. 5B is a top view of the sunlight-reactive planar member of FIG. 5A that is subjected to 0.10 to 2 hours of PAR sunlight exposure (Full Shade).

FIG. 5C is a top view of the sunlight-reactive planar member of FIG. 5A that is subjected to 3 to 4 hours of PAR sunlight exposure (Partial Shade).

DETAILED DESCRIPTION OF DRAWINGS

Figure 1:
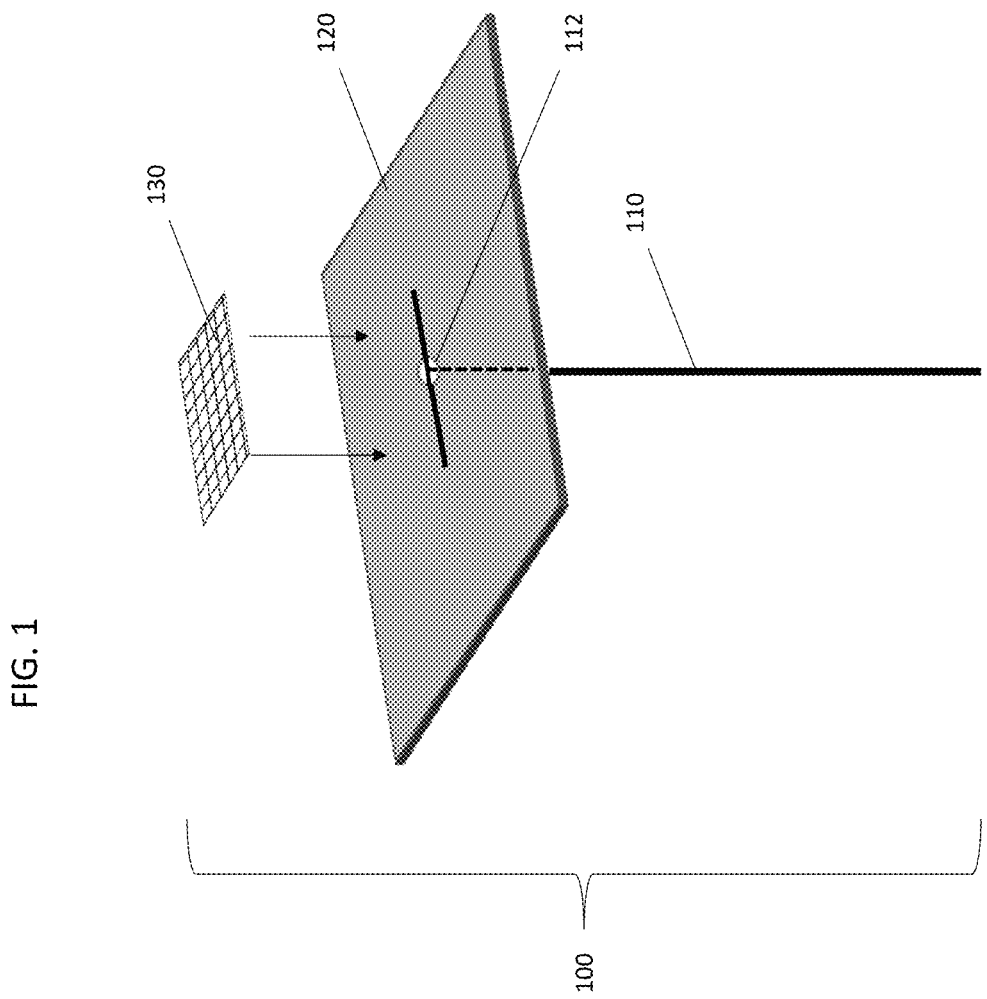
FIG. 1 is a perspective view of the PAR sunlight exposure indicator device, according to an example embodiment.

Referring first to FIG. 1, a PAR sunlight exposure indicator device 100 is shown that includes a stake 110 (shown in more detail in FIG. 6) inserted through the center-hole 112 of the sunlight-reactive planar member (shown in more detail in FIGS. 2A-5E) 120 and a peel-off sticker 130 (shown in more detail in FIG. 7) applied on top to secure the sunlight-reactive planar member 120 to the stake 110. This device 100 may be sold and distributed in sunlight-blocking packaging so that it reacts to PAR sunlight only when removed from the packaging and placed out into an area that receives PAR sunlight. When the sunlight exposure indicator device 100 is fully assembled, and the stake is inserted into a particular spot in a garden or potential landscape area, the device 100 will begin reacting to PAR sunlight exposure and over the course of the daylight hours of one day, will react, and thus, visibly indicate the amount of hours and possibly the intensity of PAR sunlight that occurs in that specific spot in one day. Multiple devices 100 may be sold together in one package at a low cost so that a user can determine the hours and possibly intensity of PAR sunlight exposure in multiple spots/locations in their landscape area all in one day. The sunlight-reactive planar member 120 is for one-time use and is disposable.

The sunlight-reactive planar member 120 may use one or more types of an irreversible photochromic pigment with slow or delayed reaction-time to 400-700 nm wavelengths to visibly display total cumulative hours of PAR sunlight exposure on a substrate. FIGS. 2A through 5E illustrate five different possible embodiments/variations to utilize irreversible, slow-reacting, photochromic pigment technology to indicate accrued PAR sunlight exposure during a one-day period.

The sunlight-reactive planar member 120 include a substrate that may be made of a cover-stock paper, such as 80 or 100 LB, cut into an approximately 5"×5" square (or possibly larger if need) with a small hole cut in the center. The hole 112 may be just large enough for the stake 110 to fit through. The cover-stock paper may be thick enough to stay level for the duration of one day when attached to the stake with the peel-off sticker. The paper is evenly or variably coated or impregnated with one or more types of an irreversible photochromic pigment and possible PAR-screening (solution) layers that cause the sunlight-reactive planar member 120 to turn to different colors or shades of one color depending on the number of PAR sunlight hours the paper is exposed to over the course of one full day. These new colors will not fade or revert back during times of shade or even after the sun exposure has stopped, enabling a user to retrieve the sunlight-reactive planar member 120 at the end of the day (e.g., after sundown) and see the accurate, permanent results of their test. The sunlight-reactive planar member 120 may also be coated with a suitable material to be water repellent so that it still works if it rains lightly or the paper is contacted by water from another source, such as a sprinkler.

The sunlight-reactive planar member 120 is also referred to herein simply as sunlight-reactive planar member 120.

Single Irreversible Photochromic Pigment—FIGS. 2A-2E

FIG. 2A shows an enlarged cross-sectional view of the sunlight-reactive planar member 120 that employs a single type of an irreversible, slow-reacting, photochromic pigment 122 applied evenly to a substrate 124. This specially formulated pigment 122 first appears as one color (or white) prior to exposure to PAR sunlight and then slowly over the course of 12+ hours of PAR sunlight exposure changes evenly to different, distinct colors or different shades of one color depending on the time duration of cumulative PAR sunlight exposure the paper experiences. This pigment 122 is formulated to have delayed or slow photochromic reactions to the PAR sunlight exposure enabling it to very accurately and visually indicate the number of PAR sunlight exposure hours (or fractions thereof) in that area. A description of a possible manufacturing process and a list of possible compounds to derive the photochromic pigment are described in more detail below.

Figure 2E:
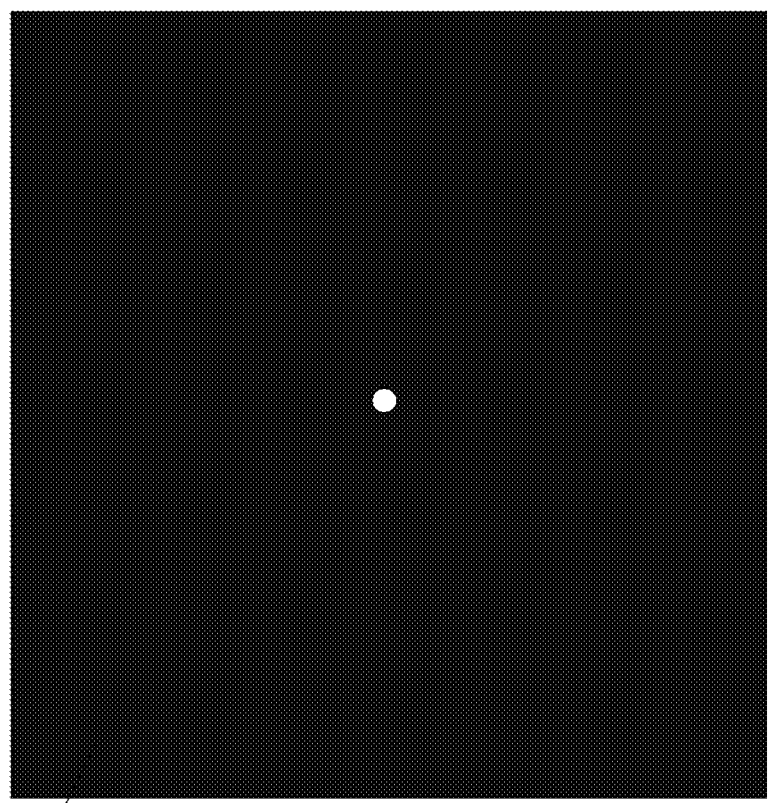
FIG. 2E is a top view of the sunlight-reactive planar member of FIG. 2A subjected to 7 or more hours of PAR sunlight exposure (Full Sun)
Figure 2D:
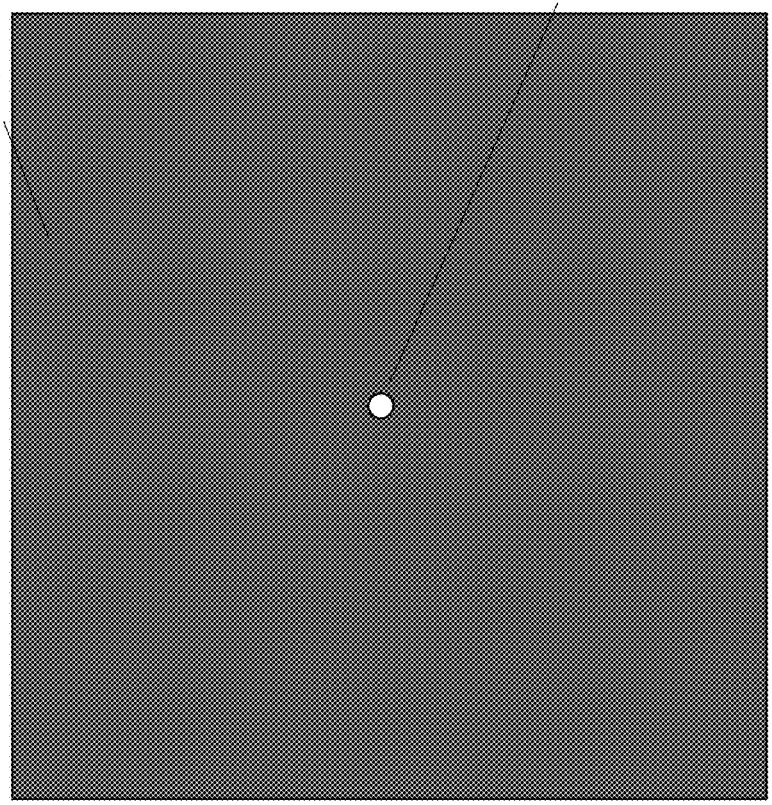
FIG. 2D is a top view of the sunlight-reactive planar member of FIG. 2A subjected to 5 to 6 hours of PAR sunlight exposure (Partial Sun).

FIGS. 2B-2E show the sunlight-reactive planar member 120 after different time durations of accrued sunlight exposure for the embodiment shown in FIG. 2A. A key (shown in FIG. 8) will be provided that explains the results in terms of the four, common plant industry categories of Full Shade, Partial Shade, Partial Sun and Full Sun. For example, the paper could be shades of very light grey if more than zero and up to 2 hours of PAR sunlight exposure occurs (FIG. 2B) and the key would indicate that this shade of grey represents Full Shade. The paper could be shades of medium grey if 3 to 4 hours of PAR sunlight exposure occur (FIG. 2C) and the key would indicate that this shade of grey represents Partial Shade. The paper could be shades of deep grey if 5 to 6 hours of PAR sunlight exposure occurs (FIG. 2D) and the key would indicate that this shade of grey represents Partial Sun. Finally, the paper could be almost black if 7 or more hours of PAR sunlight exposure occurs (FIG. 2E) and the key would indicate that this color represents Full Sun.

Single Irreversible Photochromic Pigment with PAR Screening—FIGS. 3A-3E

FIG. 3A shows the cross-sectional view of the sunlight-reactive planar member 120 with a single irreversible, slow-reacting, photochromic pigment 122 applied evenly to the substrate 124 and a PAR-screening solution or physical PAR-screening device (such as an optical filter) 126 in increasing strength levels is applied in a graduated manner on top of the pigment-coated/impregnated layer. This PAR-screening solution will affect the pigment's PAR sunlight reaction time. For example, no PAR-screening solution applied in a first strip (section) 126A of the paper so in this first strip, the pigment-coated/impregnated paper will change colors if it receives any amount of PAR sunlight. A second strip 126B of the sunlight-reactive planar member 120 will have a minimal strength PAR-screening solution applied to it. The screening solution will prevent that strip of the pigment-coated/impregnated paper from changing colors until after it has been exposed to PAR sunlight for 3 or more hours, at which point this strip will appear a distinctively different color as indicated on the key. A third strip 126C of the paper will have a medium strength PAR-screening solution applied to it. This screening solution will prevent that third strip of the pigment-coated/impregnated paper from changing colors until after it has been exposed to PAR sunlight for 5 or more hours, at which point this strip will appear a distinctively different color as indicated on the key. A fourth strip 126D of the paper will have the strongest strength PAR-screening solution applied to it. This screening solution will prevent the pigment-coated/impregnated paper from changing colors until it has been exposed to PAR sunlight for 7 or more hours, at which point this strip will appear a distinctively different color as indicated on the key. It should be understood different strengths of the strips 126A-126D of the PAR screen layers may be achieved by different thicknesses of the same type of PAR screen material or by different types of PAR screen materials.

Figure 3E:
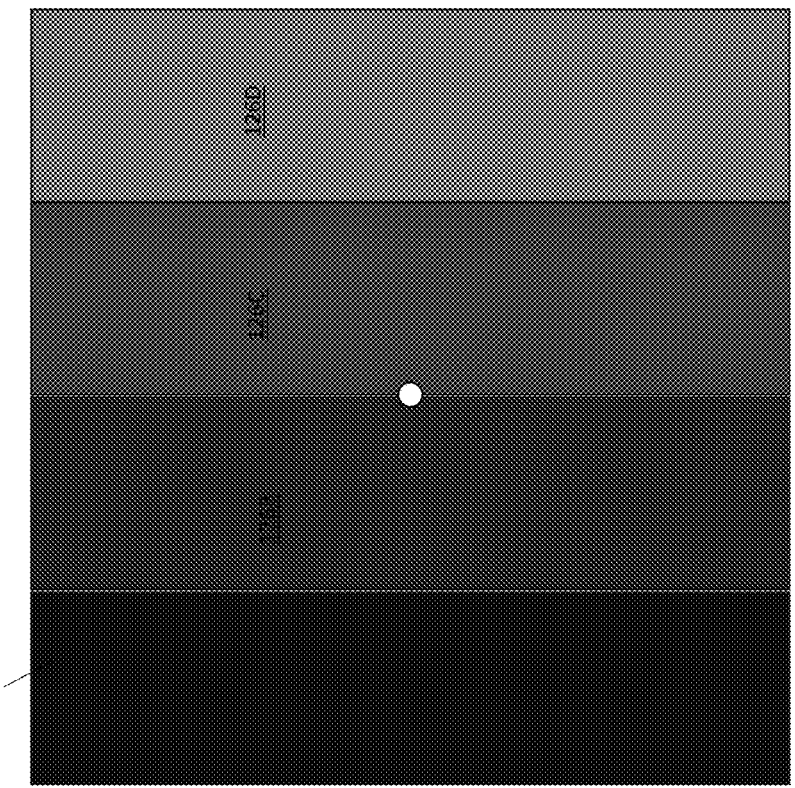
FIG. 3E is a top view top view of the sunlight-reactive planar member of FIG. 3A that is subjected to 7 or more hours of PAR sunlight exposure (Full Sun).
Figure 3D:
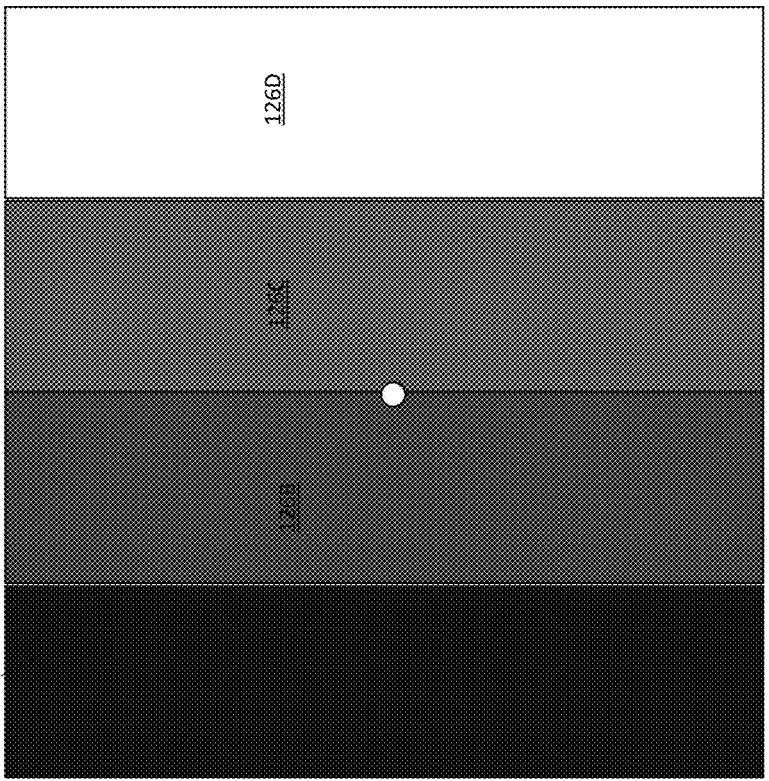
FIG. 3D is a top view of the sunlight-reactive planar member of FIG. 3A that is subjected to 5 to 6 hours of PAR sunlight exposure (Partial Sun).

FIGS. 3B-3E illustrate the possible visible differences the sunlight-reactive paper may have depending on the amount of accrued PAR sunlight exposure for the embodiment shown in FIG. 3A. For example, an area that receives no more than 2 hours of sunlight exposure would only have a visible color change in the first strip 126A of the sunlight-reactive paper (FIG. 3B); the rest of the paper would have no change in color. This test result would be represented as Full Shade on the key. An area that receives between 3 and 4 hours of PAR sunlight exposure but no more would have visible color changes in the first and second strips 126A and 126B on the sunlight-reactive paper (FIG. 3C); the remaining half of the paper would have no change in color. This test result would be represented as Partial Shade on the key. An area that receives between 5 and 6 hours of PAR sunlight exposure but no more would have visible color changes in the first, second and third strips 126A, 126B and 126C of the sunlight-reactive paper (FIG. 3D); the remaining quarter of the paper would have no change in color. This test result would be represented as Partial Sun on the key. An area that receives 7 or more hours of PAR sunlight exposure would have visible color changes in all four strips 126A, 126B, 126C and 126D of the entire sunlight-reactive paper (FIG. 3E). This test result would be represented as Full Sun on the key.

Four Different Photochromic Pigments—FIGS. 4A-1, 4A-2, 4B-4E

FIG. 4A-1 shows a cross-sectional view of sunlight-reactive planar member 120 with four different types of irreversible, photochromic pigments applied e.g., pigments 122A, 122B, 122C and 122D, a different pigment for each strip of the paper. Each photochromic pigment is specially formulated to have different sunlight reaction speeds. Each pigment may have the same starting color or may have different starting colors prior to sunlight exposure. A first pigment 122A applied on the first strip of the paper will have a moderately slow photochromic reaction time, resulting in a change of paper color if any PAR sunlight exposure occurs. A second pigment 122B applied only to the second strip of the paper will be formulated to have a slower photochromic reaction time, resulting in a change of paper color in that strip only if 3 or more hours of PAR sunlight exposure occurs. A third pigment 122C applied only to the third strip of the paper will be formulated to have an even slower photochromic reaction time, resulting in a change of color in that strip only if 5 or more hours of PAR sunlight exposure occur. A fourth pigment 122D applied only to the fourth strip of the paper will be formulated to have the slowest photochromic reaction time, resulting in a change of color in that strip only if 7 or more hours of PAR sunlight exposure occurs.

Figure 4C:
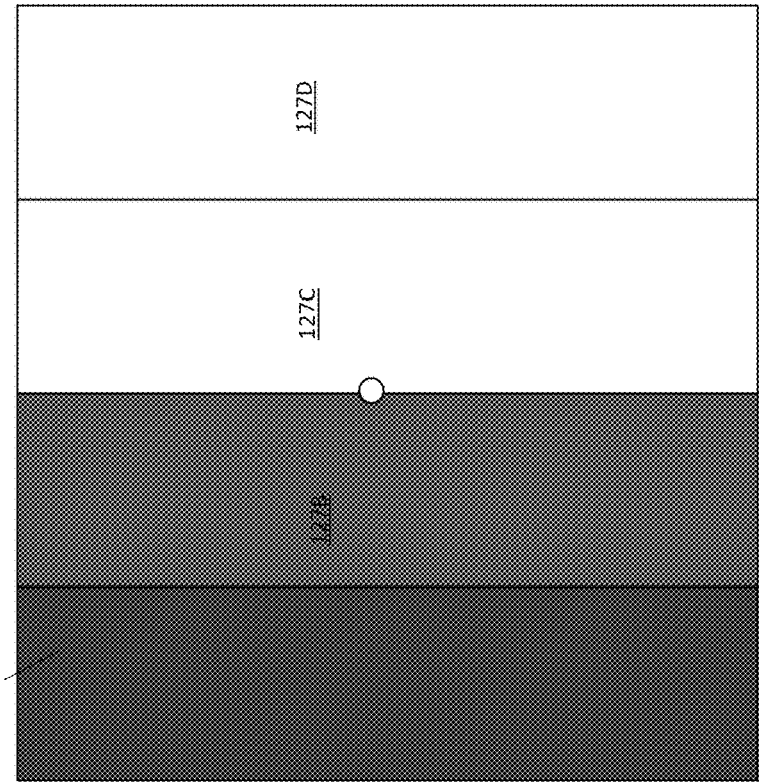
FIG. 4C is a top view of the sunlight-reactive planar member of FIGS. 4A-1 or FIG. 4A-2 that is subjected to 3 to 4 hours of PAR sunlight exposure (Partial Shade).
Figure 4B:
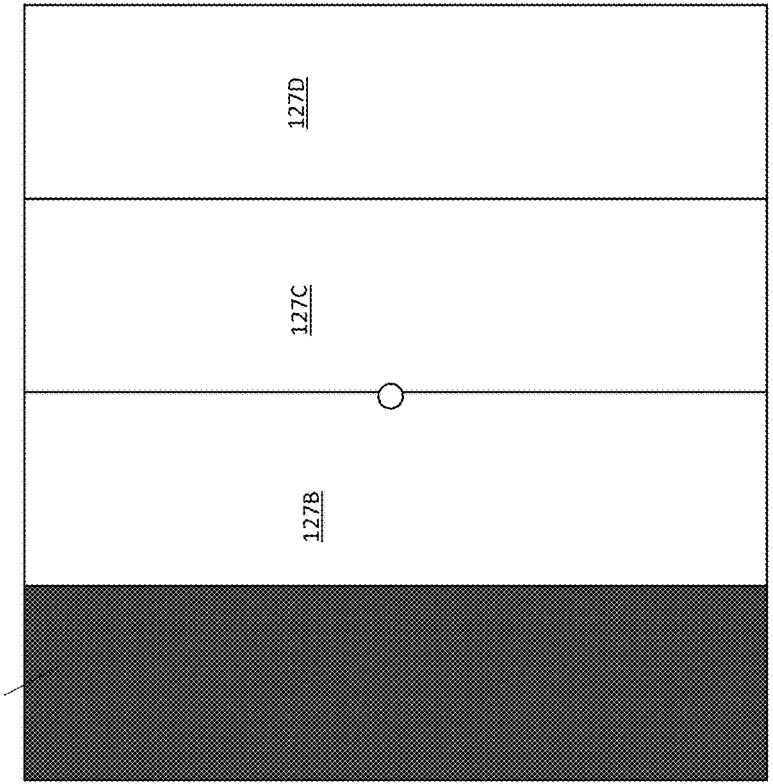
FIG. 4B is a top view of the sunlight-reactive planar member of FIGS. 4A-1 or FIG. 4A-2 that is subjected to 0.10 to 2 hours of PAR sunlight exposure (Full Shade).
Figures 1, 5A:
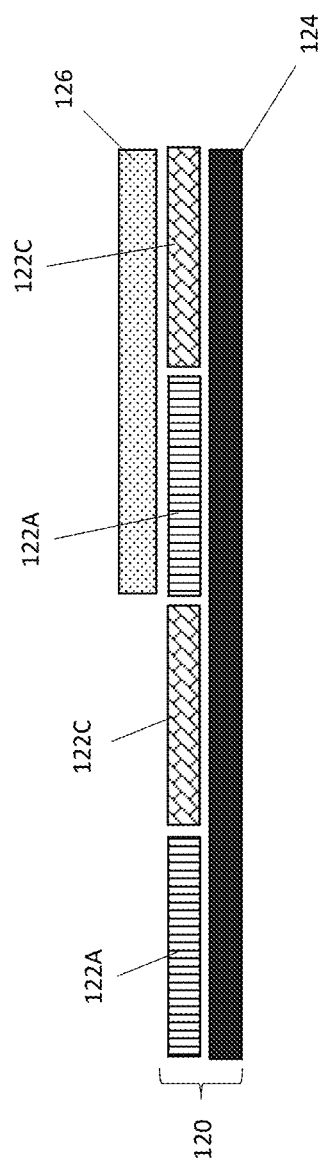
Figures 2, 5A:
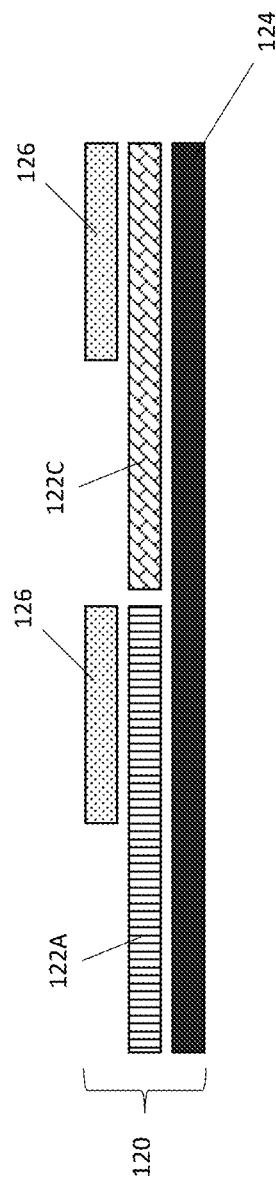
Figure 5E:
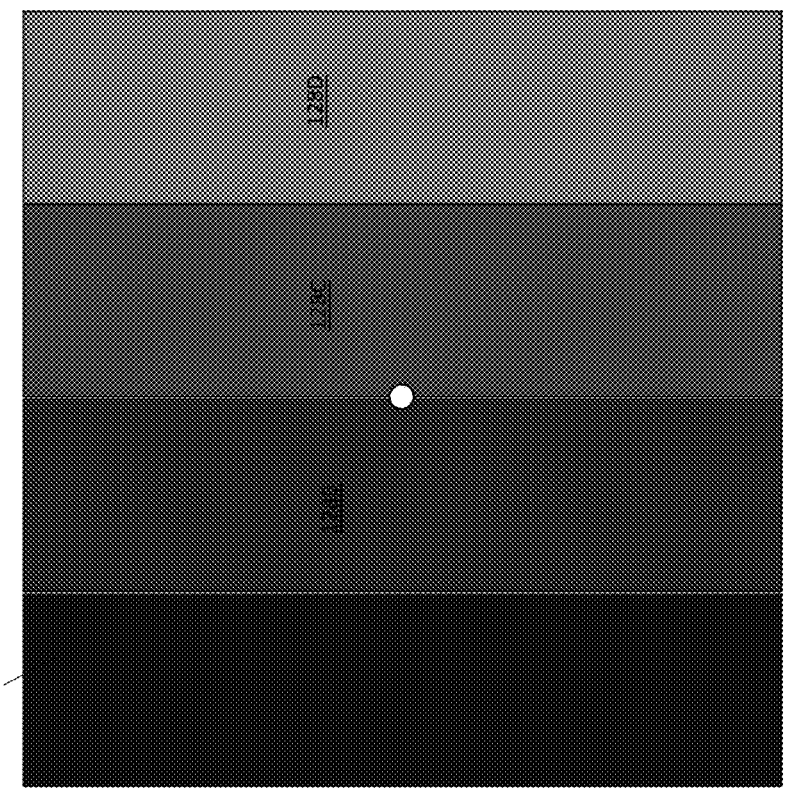
FIG. 5E is a top view of the sunlight-reactive planar member of FIG. 5A that is subjected to 7 or more hours of PAR sunlight exposure (Full Sun).
Figure 5D:
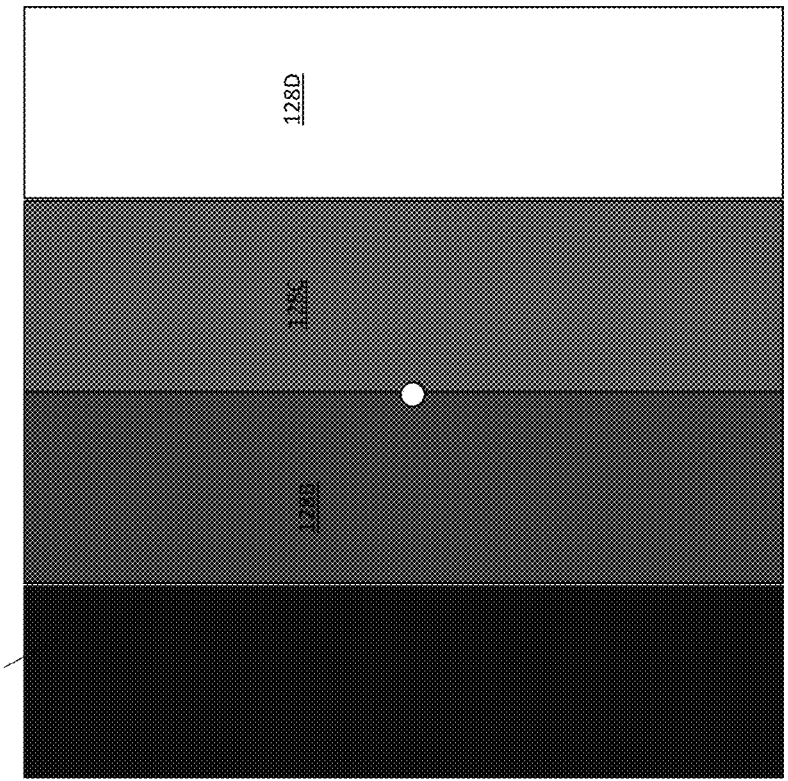
FIG. 5D is a top view of the sunlight-reactive planar member of FIG. 5A that is subjected to 5 to 6 hours of PAR sunlight exposure (Partial Sun).

FIG. 4A-2 shows a variation the sunlight-reactive planar member 120 may be coated in different sections or strips with different thicknesses (or different impregnation densities) of the same type of irreversible photochromic pigment. For example, a first section or strip is coated or impregnated with a first thickness of an irreversible photochromic pigment, as shown at 123A, a second section or strip is coated with a second thickness, greater than the first thickness, (or a second impregnation density) of an irreversible photochromic pigment, as shown at 123B, a third section or strip is coated or impregnated with a third thickness (or a third impregnation density), greater than the second thickness, of an irreversible photochromic pigment, as shown at 123C, and a fourth section or strip is coated or impregnated with a fourth thickness (or a fourth impregnation density), greater than the third thickness, of an irreversible photochromic pigment, as shown at 123D. The different sections or strips 123A-123D may have different reactive times to PAR exposure. For example, the section or strip 123A with a thinner coating/less dense impregnation of irreversible photochromic pigment may be more slowly reactive or more quickly reactive, depending on the type of irreversible photochromic pigment than the sections or strips 123B-123D with progressively thicker coatings (or more dense impregnation) of irreversible photochromic pigment. That is, depending on the type of irreversible photochromic pigment, the reactivity to PAR exposure may be slower for a thinner layer or slower for a thicker layer.

Figure 4E:
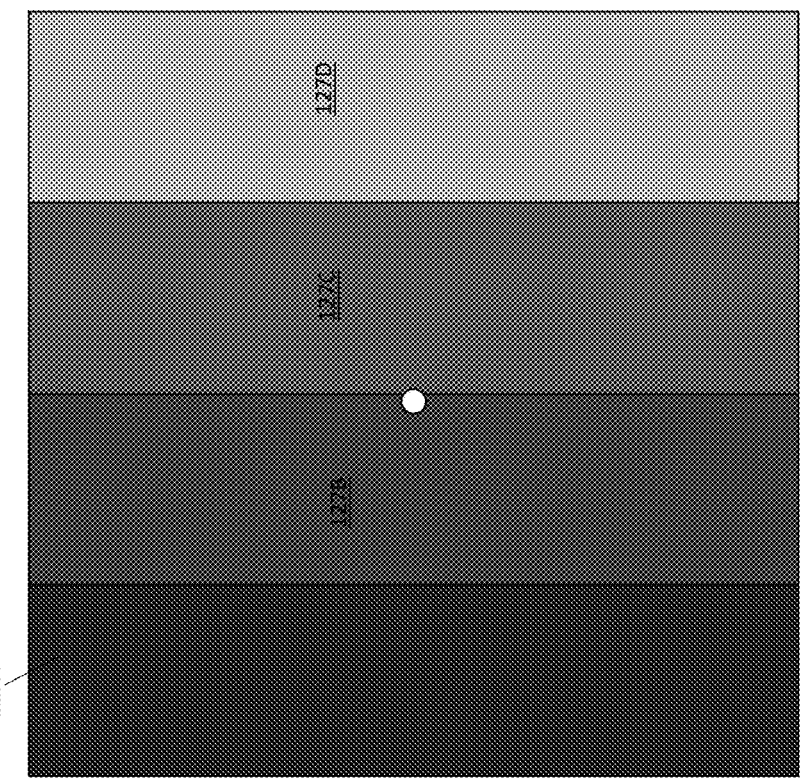
FIG. 4E is a top view of the sunlight-reactive planar member of FIGS. 4A-1 or FIG. 4A-2 that is subjected to 7 or more hours of PAR sunlight exposure (Full Sun).
Figure 4D:
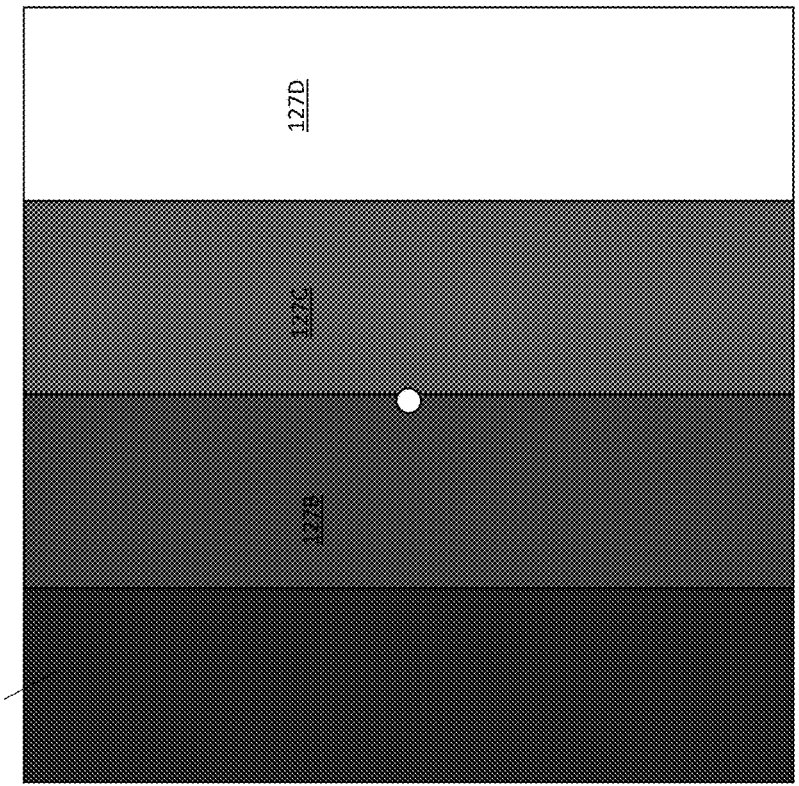
FIG. 4D is a top view of the sunlight-reactive planar member of FIG. 4A-1 or FIG. 4A-2 that is subjected to 5 to 6 hours of PAR sunlight exposure (Partial Sun).

FIGS. 4B-4E are illustrations of the possible visible differences the sunlight-reactive paper may have depending on the amount of accrued PAR sunlight exposure for the embodiments shown in FIGS. 4A-1 and 4A-2. For example, an area receiving no more than 2 hours of sunlight exposure in a day would show color change in only a first strip (FIG. 4B) 127A; the rest of the paper would have no change in color. This test result would be represented as Full Shade on the key. An area receiving between 3 and 4 hours of PAR sunlight exposure but no more would have visible color changes on first and second strips 127A and 127B of the sunlight-reactive paper (FIG. 4C); the remaining half would have no changes. This test result would be represented as Partial Shade on the key. An area receiving between 5 to 6 hours of PAR sunlight exposure but no more would have color changes on the first, second and third strips 127A, 127B and 127C of the sunlight-reactive paper (FIG. 4D); the remaining quarter of the paper would have no change in color. This test result would be represented as Partial Sun on the key. An area receiving 7 or more hours of PAR sunlight exposure would have visible color changes on the entire sunlight-reactive paper, across all four strips 127A, 127B, 127C and 127D (FIG. 4E). The test result would be represented as Full Sun on the key.

Two Different Irreversible Photochromic Pigments with Screening—FIGS. 5A-1, 5A-2, 5B-5E

FIGS. 5A-1 and 5A-2 shows the cross-sectional views of the sunlight-reactive planar member 120 with a combination of two different irreversible, slow-reacting, photochromic pigments applied, in two possible variations (denoted Variation 1 and Variation 2 in FIGS. 5A-1 and 5A-2), to the paper and then a sun PAR-screening solution or physical screening layer applied on top. This method uses two of the specially formulated pigments as described above in connection with FIGS. 4A-4E, one pigment having a mildly slow photochromic reaction time and the other pigment having a much slower photochromic reaction time and then using screening methods, such as described above in connection with FIGS. 3A-3E, to further delay the photochromic reaction times of the two pigments in order to achieve the visible color changes associated with Full Shade, Partial Shade, Partial Sun and Full Sun PAR sunlight exposure times.

The first variation (Variation 1) shown in FIG. 5A-1 involves applying the two pigments 122A and 122C, alternatingly, on each strip of the paper and then applying the screening 126 just on top of the third and fourth strips/sections of the paper. The second variation (Variation 2) shown in FIG. 5A-2 involves applying a pigment 122A over the first two strips/sections of the paper with the screening solution 126 over the second strip and then applies a pigment 122C to the third and fourth strips/sections with the screening 126 over the fourth strip.

FIGS. 5B-5E illustrate the possible visible differences the sunlight-reactive paper may have depending on the amount of accrued PAR sunlight exposure for the embodiment shown in FIG. 5A. For example, an area receiving no more than 2 hours of sunlight exposure in a day would only have a visible color change in the first strip 128A of the sunlight-reactive paper (FIG. 5B); the rest of the sunlight-reactive planar member (strips 128B, 128C and 128D) would have no change in color. The test result would be represented as Full Shade on the key. An area receiving between 3 and 4 hours of PAR sunlight exposure but no more would have visible color changes in the first and second strips 128A and 128B on the sunlight-reactive paper (FIG. 5C); the remaining half of the paper would have no change in color. The test result would be represented as Partial Shade on the key. An area receiving between 5 to 6 hours of PAR sunlight exposure but no more would have visible color changes in the first, second and third strips 128A, 128B and 128C, respectively, of the sunlight-reactive paper (FIG. 5D); the remaining quarter of the paper would have no change in color. This test result would be represented as Partial Sun on the key. An area receiving 7 or more hours of PAR sunlight exposure would have visible color changes on the entire sunlight-reactive paper (FIG. 5E), across strips 128A, 128B, 128C and 128D. This test result would be represented as Full Sun on the key.

Figure 6:
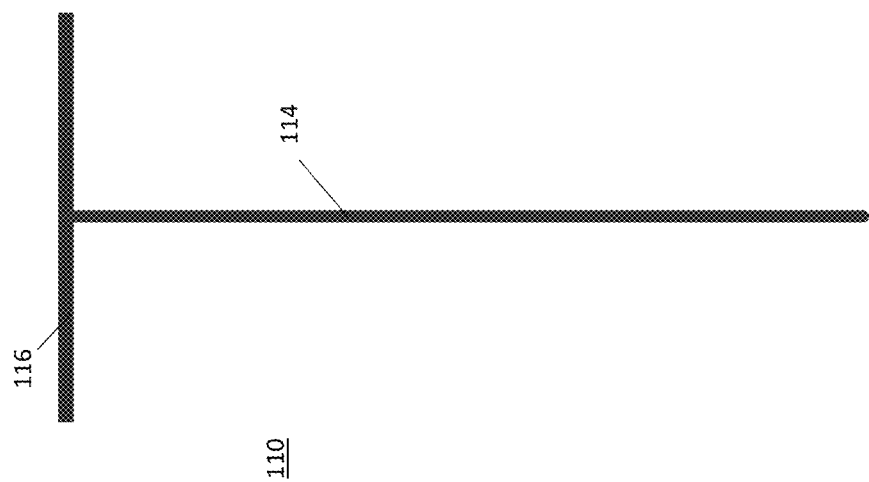
FIG. 6 illustrates a stake for securing the sunlight-reactive planar member in place and securing it into the ground, according to an example embodiment.

FIG. 6 illustrates the stake 110 used for holding the sunlight-reactive paper upright and securing it in a spot a few inches above the ground in a particular landscape area. The stake may be T-shaped and comprise a first section 114 that may be any suitable length, such as approximately 5" long, and a second section 116 that is transverse/perpendicular to the first section 114, and may be 1½" wide across the top (¾" from the center point). The stake 110 may be made of a light weight and low-cost material, such as a metal, plastic or composite material, sturdy enough to stand erect in soil for 14+ hours while supporting a small piece of paper. In operation, the stake 110 is inserted through the center-hole 112 in the sunlight-reactive planar member 120 (FIG. 1) so that the second section 116 is on top of the sunlight-reactive planar member 120. The sunlight-reactive planar member 120 is secured to the second section (the T-part) 116 of the stake 110 with the peel-off sticker 130. The first section 114 of the stake 110 has enough length to push down into the soil and secure the device 100 in place while still holding the sunlight-reactive planar member 120 approximately 2-3" above the soil so as to be sufficiently exposed to sunlight and to not become damp from the soil.

Figure 7A:
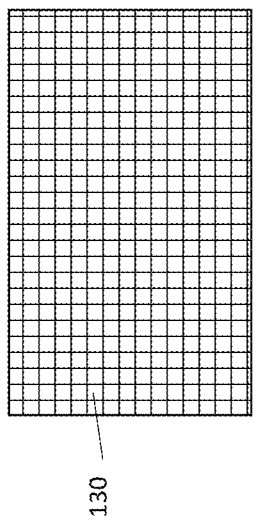
FIGS. 7A and 7B illustrate a rectangular and oval peel-off sticker to secure sunlight reactive planar member to the stake shown in FIG. 6, according to an example embodiment.
Figure 7B:
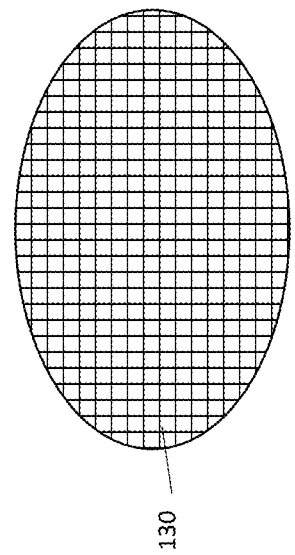

FIGS. 7A and 7B illustrate the rectangular or oval, peel-off, one-sided sticker 130. The sticker 130 serves as one example of a fastener that serves to fasten the planar member 120 to the stake 110. The sticker 130 may be approximately 1¾" in diameter or width. FIG. 7A shows the sticker 130 has a rectangular shape and FIG. 7B shows the sticker 130 has an oval shape, as examples. The sticker 130 may be sturdy enough to adhere the sunlight-reactive planar member 120 over the second section of the stake 110 for 14+ hours. After the stake 110 is inserted through the center-hole 112 of the sunlight-reactive planar member 120 with the second section (T-portion) 116 on top of the sunlight-reactive planar member 120, the peel-off sticker 130 is placed directly on top of the second section 116 of the stake 110 and also onto the sunlight-reactive planar member 120 securing the sunlight-reactive planar member 120 to the stake 110, essentially holding the sunlight-reactive planar member 120 to the top of the stake 110. This will keep the sunlight-reactive planar member 120 in place and level while the stake 110 is installed in the ground. The sticker 130 may or may not be coated or impregnated with any irreversible photochromic pigment.

Figure 8:
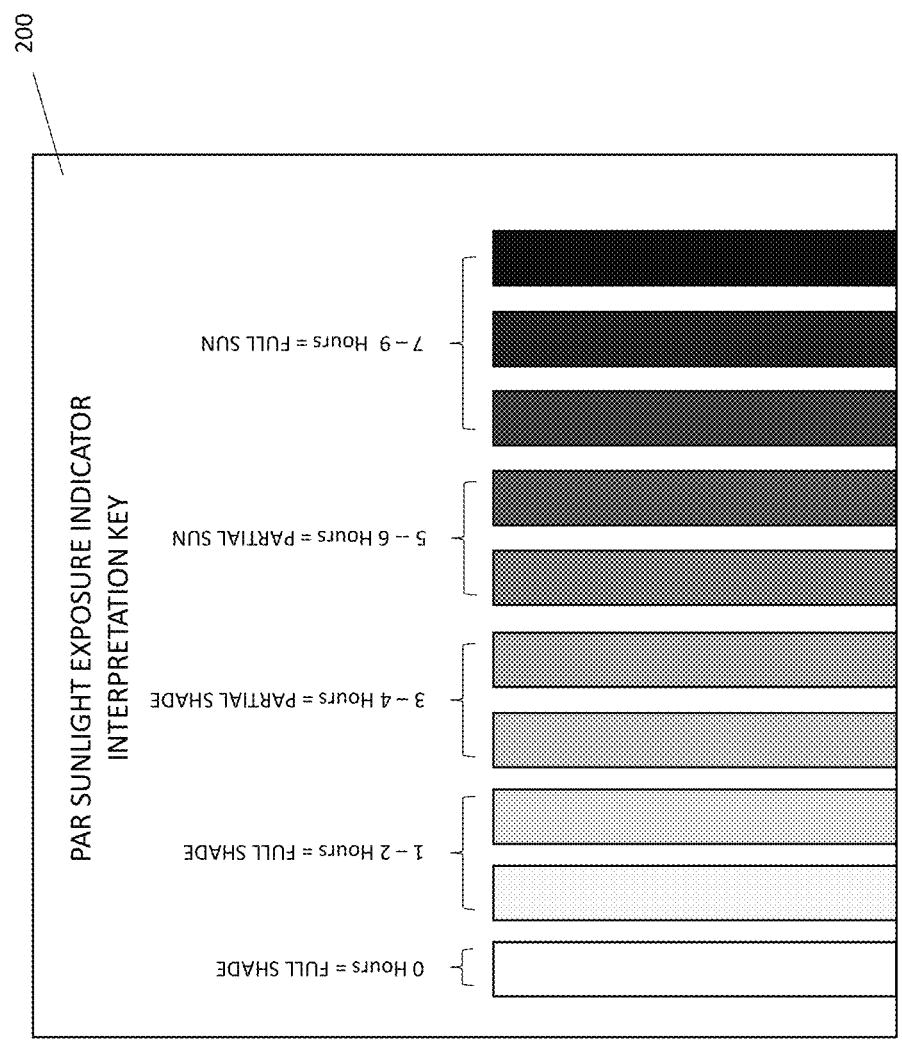
FIG. 8 illustrates an example of an interpretation key for the PAR sunlight exposure indicator device, according to an example embodiment.

FIG. 8 illustrates an example of the PAR sunlight interpretation key 200. This PAR sunlight interpretation key 200, which will be printed on a piece of paper, will be used to interpret the measurement results from the sunlight-reactive planar member 120. This key 200 will contain a chart of colors which match the colors that appear on the sunlight-reactive paper prior to and after exposure to PAR sunlight over increasing hours. After placing the fully assembled PAR sunlight exposure indicator device in a particular landscape spot all day, the sunlight-reactive paper will display a certain color or colors. The user will hold the exposed PAR sunlight-reactive paper up to the interpretation key and match up the color results. Adjacent to each color on the key will be a list of the total accrued number of hours of PAR sunlight indicated by that color. The PAR sunlight interpretation key 200 will then explain how the number of hours of sunlight exposure corresponds with the plant industry common designations of Full Shade, Partial Shade, Partial Sun and Full Sun.

Full Shade—0 to 2 hours of PAR sunlight exposure either direct or filtered
Partial Shade—3 to 4 hours of PAR sunlight exposure
Partial Sun—5 to 6 hours of PAR sunlight exposure
Full Sun—7 or more hours of PAR sunlight exposure
Note that this device may be configured to present a variation of the PAR exposure test results, such that it shows three category designations of results (hours of accrued PAR exposure) per a variation on the plant industry common designations of Full Shade, Partial Shade/Partial Sun, and Full Sun, as defined below:
Full Shade—0 to 3 hours of PAR sunlight exposure either direct or filtered
Partial Shade/Partial Sun—3 to 7 hours of PAR sunlight exposure
Full Sun—7 or more hours of PAR sunlight exposure Manufacturing Process The sunlight-reactive planar member 120 for the device 100 may be produced by printing photochromic pigment(s) on a sheet of paper which is then cut down into individual components, keeping the cost per unit lower. The precise amount and thickness of the irreversible, slow-reacting, photochromic pigment(s) to be applied to the paper may be determined through trial and error testing. The precise amount, thickness, and strength of the possible PAR-screening solution (used in certain embodiments described above) and the method for applying it on top of the pigment may be determined through trial and error testing. The irreversible, slow-reacting, photochromic pigments may be derived from or contain any suitable one or more types of photochromic dyes which, when implemented for use with the indicator device are capable of performing in a manner as described herein. Some examples of irreversible photochromic dyes include, without limitation, diarylethene compounds, Spiropyran compounds, azobenzene compounds, fulgide compounds, and quinone compounds; as well as inorganic compounds such as certain silver and zinc halides (e.g., silver chloride), or tungsten oxide or other oxide compounds; or coordination complexes such as sodium nitroprusside and the ruthenium sulfoxide. The precise formulation may be determined through trial and error testing. The possible sun-screening solution may contain agents such as titanium dioxide, kaolin, talc, zinc oxide, iron oxide, calamine, ichthammol, calcium carbonate, magnesium oxide, bemotrizinol, avobenzone, bisoctizole, benzophenone-3, ecamsule, and silatriazole. The precise formulation will be determined through trial and error testing.

Applications of the Device

The sunlight indicator device 100 is useful for commercial and residential users. Related commercial businesses such as nurseries, hardware stores, landscape companies or large scale yard and landscape product distributers might sell or use this product. Plant nurseries, commercial retailers which sell plants and landscape installers often guarantee the plants they install or sell on good faith that the installer has accurately determined sunlight exposure. These companies could suggest their customers use this sunlight exposure indicator device 100 in order to receive a full guarantee. Landscaping companies could utilize these devices on a client site as an aid in selecting the plants for the client. Residential users could use this device in numerous locations on the property around their home to determine, for example, where to locate a vegetable garden, what type of annual flowers will do best near the front door, whether full shade shrubs are appropriate on the north side of the house, whether the north side of the house gets enough morning and afternoon sun to select partial shade or even partial sun shrubs. Residential users or landscapers can also use this device to determine the best type of grass sod or seed to use in a yard. This device 100 could even be used inside a home for selecting the proper house plant for a particular spot in the home. These are just some of the examples of uses of this device.

In summary, in one form, an apparatus is provided comprising: a stake member having a first section and a second section that is transverse to the first section; a sunlight-reactive planar member having a hole therein configured to accept the first section of the stake, wherein the sunlight-reactive planar member comprises a substrate coated or impregnated with a layer of at least one type of an irreversible photochromic pigment that is reactive to exposure to photosynthetically active radiation (PAR) and changes to different colors or shades of a color over different ranges of cumulative hours of exposure to PAR; and a sticker or other attachable securing device configured to fit on top of the sunlight-reactive planar member over the hole and over the second section of the stake to be secured on top of the sunlight-reactive planar member to the stake. The substrate of the sunlight-reactive planar member may be made of a paper material. The apparatus may father comprise a water repellent coating on the sunlight-reactive planar member. In one form, the irreversible photochromic pigment is reactive to PAR, the visible light spectrum of 400 nm-700 nm.

In one form, the layer of the irreversible photochromic pigment is a single type of irreversible photochromic pigment. In this case, substrate comprises a plurality of sections of the to which a corresponding different strength PAR-screening layer is disposed over the layer of the irreversible photochromic pigment such that the plurality of sections have different reactivity to different ranges of cumulative hours of exposure to PAR. In a variation, the substrate comprises a plurality of sections to which a PAR-screening coating of corresponding different thicknesses is disposed over the layer of irreversible photochromic pigment such that the plurality of sections have different reactivity to different ranges of cumulative hours of exposure to PAR.

In another form, the substrate comprises a plurality of sections of the substrate to which an irreversible photochromic pigment of corresponding different thicknesses is disposed or impregnated such that the plurality of sections have different reactivity to different ranges of cumulative hours of exposure to PAR. The apparatus may comprise a PAR-screening layer disposed over one or more of the plurality of sections such that the plurality of sections have different reactivity to different ranges of cumulative hours of exposure to PAR.

In still another form, the substrate comprises a plurality of sections of the substrate which are coated with at least two corresponding different types of irreversible photochromic pigments such that the plurality of sections have different reactivity to different ranges of cumulative hours of exposure to PAR. In this case, the apparatus may comprise a PAR-screening layer disposed over one or more of the plurality of sections such that the plurality of sections have different reactivity to different ranges of cumulative hours of exposure to PAR.

In one form, the different ranges of cumulative hours of exposure to PAR correspond to common plant industry categories of Full Shade, Partial Shade, Partial Sun and Full Sun, or Full Shade, Partial Shade/Partial Sun, and Full Sun.

In yet another form, an apparatus is provided comprising: a planar member comprising a substrate coated or impregnated with a layer of at least one type of an irreversible photochromic pigment that is reactive to exposure to photosynthetically active radiation (PAR) and changes to different colors or shades of a color over different ranges of cumulative hours of exposure to PAR; and a mounting device configured to affix to the planar member and be inserted into the ground to hold the planar member above a ground.

In still another form, an apparatus is provided comprising: a stake having a first section and a second section that is transverse to the first section; a sunlight-reactive planar member comprising a substrate coated or impregnated with a layer of at least one type of an irreversible photochromic pigment that is reactive to exposure to photosynthetically active radiation (PAR) and changes to different colors or shades of a color over different ranges of cumulative hours of exposure to PAR; and a fastener configured to secure the stake to the sunlight-reactive planar member.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. An apparatus comprising:
    a stake having a first section and a second section that is transverse to the first section;
    a sunlight-reactive planar member having a hole therein configured to accept the first section of the stake, wherein the sunlight-reactive planar member comprises a substrate coated or impregnated with a layer of at least one type of an irreversible photochromic pigment that is reactive to exposure to photosynthetically active radiation (PAR) and changes to different colors or shades of a color over different ranges of cumulative hours of exposure to PAR; and
    a sticker configured to be secured on top of the sunlight-reactive planar member over the hole and over the second section of the stake to secure the sunlight-reactive planar member to the stake.

2. The apparatus of claim 1, wherein the layer of the irreversible photochromic pigment is a single type of irreversible photochromic pigment.

3. The apparatus of claim 2, and wherein the substrate comprises a plurality of sections to which a corresponding different strength PAR-screening layer is disposed over the layer of the irreversible photochromic pigment such that the plurality of sections have different reactivity to different ranges of cumulative hours of exposure to PAR.

4. The apparatus of claim 2, wherein the substrate comprises a plurality of sections to which a PAR-screening coating of corresponding different thicknesses is disposed over the layer of irreversible photochromic pigment such that the plurality of sections have different reactivity to different ranges of cumulative hours of exposure to PAR.

5. The apparatus of claim 1, wherein the substrate comprises a plurality of sections to which an irreversible photochromic pigment of corresponding different thicknesses is disposed or impregnated such that the plurality of sections have different reactivity to different ranges of cumulative hours of exposure to PAR.

6. The apparatus of claim 5, and further comprising a PAR-screening layer disposed over one or more of the plurality of sections such that the plurality of sections have different reactivity to different ranges of cumulative hours of exposure to PAR.

7. The apparatus of claim 1, wherein the substrate comprises a plurality of sections to which are coated with at least two corresponding different types of irreversible photochromic pigments such that the plurality of sections have different reactivity to different ranges of cumulative hours of exposure to PAR.

8. The apparatus of claim 7, and further comprising a PAR-screening layer disposed over one or more of the plurality of sections such that the plurality of sections have different reactivity to different ranges of cumulative hours of exposure to PAR.

9. The apparatus of claim 1, wherein the different ranges of cumulative hours of exposure to PAR correspond to common plant industry categories of Full Shade, Partial Shade, Partial Sun and Full Sun, or Full Shade, Partial Shade/Partial Sun, and Full Sun.

10. The apparatus of claim 1, wherein the substrate of the sunlight-reactive planar member is made of a paper material.

11. The apparatus of claim 10, further comprising a water repellent coating on the sunlight-reactive planar member.

12. The apparatus of claim 1, wherein the irreversible photochromic pigment is reactive to PAR, the visible light spectrum of 400 nm-700 nm.

13. An apparatus comprising:
    a planar member comprising a substrate coated or impregnated with a layer of at least one type of an irreversible photochromic pigment that is reactive to exposure to photosynthetically active radiation (PAR) and changes to different colors or shades of a color over different ranges of cumulative hours of exposure to PAR; and
    a mounting device configured to affix to the planar member and be inserted into a ground to hold the planar member above the ground.

14. The apparatus of claim 13, wherein the layer of the irreversible photochromic pigment is a single type of irreversible photochromic pigment.

15. The apparatus of claim 13, wherein the substrate comprises a plurality of sections to which a corresponding different strength PAR-screening layer is disposed over the layer of the irreversible photochromic pigment such that the plurality of sections have different reactivity to different ranges of cumulative hours of exposure to PAR.

16. The apparatus of claim 13, wherein the substrate comprises a plurality of sections to which an irreversible photochromic pigment of corresponding different thicknesses is disposed or impregnated such that the plurality of sections have different reactivity to different ranges of cumulative hours of exposure to PAR.

17. The apparatus of claim 13, wherein the different ranges of cumulative hours of exposure to PAR correspond to common plant industry categories of Full Shade, Partial Shade, Partial Sun and Full Sun, or Full Shade, Partial Shade/Partial Sun, and Full Sun.

18. An apparatus comprising:
   a stake having a first section and a second section that is transverse to the first section;
   a sunlight-reactive planar member comprising a substrate coated or impregnated with a layer of at least one type of an irreversible photochromic pigment that is reactive to exposure to photosynthetically active radiation (PAR) and changes to different colors or shades of a color over different ranges of cumulative hours of exposure to PAR; and
   a fastener configured to secure the stake to the sunlight-reactive planar member.

19. The apparatus of claim 18, wherein the layer of the irreversible photochromic pigment is a single type of irreversible photochromic pigment, and wherein the substrate comprises a plurality of sections to which a corresponding different strength PAR-screening layer is disposed over the layer of the irreversible photochromic pigment such that the plurality of sections have different reactivity to different ranges of cumulative hours of exposure to PAR.

20. The apparatus of claim 18, wherein the substrate comprises a plurality of sections to which an irreversible photochromic pigment of corresponding different thicknesses is disposed or impregnated such that the plurality of sections have different reactivity to different ranges of cumulative hours of exposure to PAR.

* * * * *